US012766786B2

(12) United States Patent
Elsworthy

(10) Patent No.: US 12,766,786 B2
(45) Date of Patent: Oct. 20, 2026

(54) DEVICE HAVING A NON-PLANAR LAYER, APPARATUS FOR MANUFACTURING A DEVICE, AND METHOD OF MANUFACTURING A DEVICE

(71) Applicant: Q5D Technologies Limited, Bristol (GB)

(72) Inventor: Christopher Thomas Elsworthy, North Somerset (GB)

(73) Assignee: Q5D Technologies Limited, Bristol (GB)

(*) Notice: Subject to any disclaimer, the term of this patent is extended or adjusted under 35 U.S.C. 154(b) by 451 days.

(21) Appl. No.: 18/253,763

(22) PCT Filed: Nov. 16, 2021

(86) PCT No.: PCT/GB2021/052964
§ 371 (c)(1),
(2) Date: May 19, 2023

(87) PCT Pub. No.: WO2022/106816
PCT Pub. Date: May 27, 2022

(65) Prior Publication Data

US 2023/0415410 A1 Dec. 28, 2023

(30) Foreign Application Priority Data

Nov. 20, 2020 (GB) ...................................... 2018252

(51) Int. Cl.
*B29C 64/364* (2017.01)
*B29C 64/118* (2017.01)
(Continued)

(52) U.S. Cl.
CPC .......... *B29C 64/194* (2017.08); *B29C 64/118* (2017.08); *B29C 64/232* (2017.08);
(Continued)

(58) Field of Classification Search
CPC ......... B33Y 10/00; B33Y 30/00; B33Y 80/00; B29C 64/194; B29C 64/364;
(Continued)

(56) References Cited

U.S. PATENT DOCUMENTS 4,715,100 A 12/1987 Cross
2015/0197602 A1 7/2015 Shinar et al.
(Continued)

FOREIGN PATENT DOCUMENTS

DE 10 2017 120750 7/2022
EP 3505401 7/2019

OTHER PUBLICATIONS

Carolo, "5-Axis 3D Printer: The Latest Advancements" (2020) retrieved from: https://all3dp.com/2/5-axis-3d-printer-the-latest-advancements/ on Mar. 8, 2024.
(Continued)

*Primary Examiner* — Alison L Hindenlang
*Assistant Examiner* — Debjani Roy
(74) *Attorney, Agent, or Firm* — Levine Bagade Han LLP

(57) ABSTRACT

Devices (102) formed using additive manufacturing are disclosed. In one arrangement, a device comprises at least one non-planar layer (104) formed of a plurality of filaments. The device has one or more functional elements (108). Each functional element comprises an electrically conductive element, an optical fibre or a hollow tube. A portion of each functional element is embedded in and geometrically conforms with one of the non-planar layers, or is arranged between and geometrically conforms with two of the non-planar layers.

10 Claims, 13 Drawing Sheets

(51) Int. Cl.

| | |
|---|---|
| ***B29C 64/194*** | (2017.01) |
| ***B29C 64/232*** | (2017.01) |
| ***B29C 64/236*** | (2017.01) |
| ***B29C 64/241*** | (2017.01) |
| ***B29C 64/268*** | (2017.01) |
| ***B29C 64/336*** | (2017.01) |
| ***B33Y 10/00*** | (2015.01) |
| *B29L 9/00* | (2006.01) |
| *B33Y 30/00* | (2015.01) |
| *B33Y 80/00* | (2015.01) |

(52) U.S. Cl.
CPC .......... *B29C 64/236* (2017.08); *B29C 64/241* (2017.08); *B29C 64/268* (2017.08); *B29C 64/336* (2017.08); *B29C 64/364* (2017.08); *B33Y 10/00* (2014.12); *B29K 2995/0005* (2013.01); *B29L 2009/003* (2013.01); *B33Y 30/00* (2014.12); *B33Y 80/00* (2014.12)

(58) Field of Classification Search
CPC ... B29C 64/118; B29C 64/232; B29C 64/236; B29C 64/241; B29C 64/268
See application file for complete search history.

(56) References Cited

U.S. PATENT DOCUMENTS

| | | | | |
|---|---|---|---|---|
| 2015/0300971 | A1 | 10/2015 | Zemp | |
| 2016/0067928 | A1* | 3/2016 | Mark | B29C 70/16 425/150 |
| 2016/0141821 | A1 | 5/2016 | Conte | |
| 2016/0322792 | A1 | 11/2016 | Dober et al. | |
| 2019/0027906 | A1 | 1/2019 | Blum et al. | |
| 2019/0164662 | A1 | 5/2019 | Alfson et al. | |
| 2019/0337053 | A1 | 11/2019 | Moosberg et al. | |
| 2019/0351611 | A1 | 11/2019 | Peterson et al. | |
| 2020/0207024 | A1* | 7/2020 | Morris | B29C 70/38 |
| 2021/0060863 | A1 | 3/2021 | Rudolph et al. | |
| 2021/0339488 | A1* | 11/2021 | Cardenas | B33Y 80/00 |
| 2023/0264414 | A1 | 8/2023 | Erickson et al. | |
| 2024/0083119 | A1* | 3/2024 | Coulier | B29C 64/153 |

OTHER PUBLICATIONS

Diegel et al "Curved Layer Fused Deposition Modeling in Conductive Polymer Additive Manufacturing" Key Engineering Materials, 467-469, 662-667 (2011).
Kim et al."Cooperative Tool Path Planning for Wire Embedding on Additively Manufactured Curved Surfaces using Robot Kinematics" Journal of Mechanisms and Robotic,s vol. 7, 021003 (2015).
Minjares, "Development of A Multi-Axis Wire Embedding Device For A Large Development Of A Multi-Axis Wire Embedding Device For A Large Area Thermoplastic Pellet-Fed Additive Manufacturing System Area Thermoplastic Pellet-Fed Additive Manufacturing System" University of Texas at El Paso (2020).
Q5D Technology, Sep. 16, 2019, "Q5D Introduction" video; available from: https://www.youtube.com/watch?v=VvqJHBRyTKs (accessed: Apr. 20, 2021).
Yuen "Embedding objects during 3D printing to add new functionalities" Biomicrofluidics 10, 044104 (2016).
Zubel et al. "Embedding silica and polymer fibre Bragg gratings (FBG) in plastic 3D-printed sensing patches" Proceedings of SPIE, vol. 9886 (2016).

* cited by examiner

DEVICE HAVING A NON-PLANAR LAYER, APPARATUS FOR MANUFACTURING A DEVICE, AND METHOD OF MANUFACTURING A DEVICE

This application is a U.S. national phase application of International Application No. PCT/GB2021/052964 filed on Nov. 16, 2021, which claims the benefit of priority to GB 2018252.3, filed on Nov. 20, 2020, the contents of which are incorporated herein by reference in their entireties.

The present invention relates to devices having non-planar layers formed using additive manufacturing and associated functional elements.

Three-dimensional (3D) components are often manufactured by printing successive planar two-dimensional (2D) layers which build up the overall 3D structure. The shape of the 3D structure is determined by the lateral extent of each of the 2D layers. This manufacturing technique has some drawbacks, including relatively slow speed. Also, in order to ensure that the 3D structure does not collapse during manufacture, support structures often have to be printed to support the structure. When 3D components having curved surfaces are formed using such techniques, the curved surfaces often have a stepped profile, rather than being smooth as may be desired. Additionally, as each 2D layer is planar, when the layers together form curved surfaces, the layers are not necessarily aligned with likely stress directions in the structure, for example along the curve. This can lead to the structure being weak or undesirably thick to achieve a desired strength.

A conventional fused filament fabrication (FFF) printer builds up a 3D structure by printing successive 2D layers. The surfaces perpendicular to the layers are often very rough, making it difficult to add other components which run along the surface of the 2D layers and traverse the stepped portions. Accordingly, it has been difficult to increase the functionality of such components and as a result few layered components having additional functionality exist.

Embodiments of the present disclosure aim to at least partially address one or more of the problems discussed above and/or other problems.

According to an aspect of the invention, there is provided a device a device comprising: at least one non-planar layer formed of a plurality of filaments deposited by an additive manufacturing technique; and one or more functional elements, each functional element comprising an electrically conductive element, an optical fibre or a hollow tube, and having a portion that is: a) embedded in and geometrically conforming with one of the non-planar layers, or b) arranged between and geometrically conforming with two of the non-planar layers.

The provision of an additively manufactured structure having non-planar layers and incorporated functional elements that geometrically conform with the layers provides enhanced functional flexibility in comparison with structures formed using alternative additive manufacturing processes.

Where the portion of the functional element is embedded in one of the non-planar layers, the portion may be arranged between, in direct contact with, and aligned with, two filaments forming the non-planar layer. This approach may allow the functional element to be incorporated with minimal disruption to the structural integrity of the rest of the non-planar layer.

In an embodiment, at least a subset of the functional elements are elongate. Each of one or more of the functional elements may be aligned with at least one of the filaments forming a non-planar layer contacting the functional element. Each of one or more of the elongate functional elements may be an elongate electrically conductive element. Providing elongate electrically conductive elements in the manner described allows electrical signal and/or power lines to be provided in a mechanically robust structure. Allowing the structure to follow non-planar trajectories without stepped profiles improves flexibility and/or reliability. Protecting the electrically conductive elements using the non-planar layers may allow smaller gauge wires to be used, thereby saving weight. The embedding or sandwiching of the electrically conductive elements reduces relative movement between them, thereby reducing or avoiding fretting and wear.

In some embodiments, the functional elements comprise electrically conductive elements of different types, including for example a first set of electrically conductive elements used for power lines (e.g. of relatively large gauge) and a second set of electrically conductive elements used for signal lines (e.g. of relatively small gauge). In some embodiments, one or more electrically conductive elements comprising preformed conductive elements (e.g. wires) are provided in combination with one or more electrically conductive elements comprising deposited tracks, preferably laser processed tracks (e.g. tracks formed by irradiating a layer of precursor material to increase an electrical conductivity of the precursor material). The preformed conductive elements may be used for power lines while the laser processed conductive tracks may be used for signal lines. Integrating the two different types of electrically conductive elements into the same additively manufactured structure provides enhanced flexibility for providing efficient and reliable electrical wiring arrangements in comparison with prior art alternatives (e.g. prior art wiring harnesses).

The solid structure formed from the non-planar layers lends itself to study by finite element analysis. This allows stresses and strains to be modelled accurately. The modelling can be used to tailor the device to operate optimally in specific application scenarios.

In some embodiments, the device further comprises one or more elongate reinforcing fibres. Each elongate reinforcing fibre may be: embedded in and geometrically conforming with one of the non-planar layers; or arranged between and geometrically conforming with two of the non-planar layers. The inclusion of such reinforcing fibres may increase the strength of the device, particularly in regions adjacent to the fibres.

In some embodiments, each of one or more of the elongate reinforcing fibres is adjacent to and/or aligned with a respective elongate portion of one of the functional elements. This approach reduces the risk of damage to functional elements when stresses are applied to the device. For example, thermal expansion or strain of the substrate has been shown to break printed conductive tracks in the absence of reinforcing fibres, and is expected to do the same to fine gauge wiring or optical fibres. This is a particular problem when the substrate is an elastic rather than a rigid substrate like FR4. Embedding a stiffening reinforcing fibre near to the functional element (e.g. conductive element) will protect it from such damage.

In some embodiments, a plurality of the elongate reinforcing fibres having different orientations are provided in the form of a strengthening mat that geometrically conforms with the non-planar layer or non-planar layers, the orientations of the reinforcing fibres providing stiffness along multiple directions. The provision of such a strengthening mat may improve reliability, for example, where complex arrangements of printed tracks are needed to feed surface mounted components. Such arrangements are likely to be particularly sensitive to strain and thermal expansion of the substrate material. The embedded strengthening mat provides the local rigidity to protect the arrangement.

In some embodiments, a plurality of the functional elements is provided and each functional element has: a portion embedded in and geometrically conforming with a different respective one of the non-planar layers; or a portion embedded between and geometrically conforming with a different respective pair of adjacent non-planar layers. This approach provides particularly effective mechanical, optical and/or electrical isolation between the portions of the functional elements while allowing high flexibility in the range of configurations of the functional elements that are possible.

In some embodiments, the one or more functional elements comprises an electrically conductive element; and the device further comprises a Surface-Mount Device (SMD) (which may also be referred to as a Surface Mounted Device) connected to the electrically conductive element. SMDs encompass electronic devices that may be placed or mounted on a surface of a printed circuit board (PCB), for example using surface-mount technology. The SMD could be a passive electrical or electronic component or an active device like a processor or sensor. In some embodiments, the SMD is provided at an interface between adjacent non-planar layers. This may allow the non-planar layers to provide support to the SMD particularly effectively.

According to an aspect, there is provided an apparatus for manufacturing a device, comprising: a deposition module configured to progressively deposit filaments to form a structure comprising at least one layer, and to deposit one or more functional elements, each functional element comprising an electrically conductive element, an optical fibre or a hollow tube, so as to be embedded within the layer, or arranged between two layers; and a spatial manipulation system configured to allow relative movement between a structure being formed and at least a portion of the deposition module, the relative movement including translation relative to three mutually non-parallel translation axes and rotation about two mutually non-parallel rotation axes during either or both of the progressive deposition of material and the deposition of the one or more functional elements.

In some embodiments, the spatial manipulation system comprises: a first subsystem configured to provide the translation relative to the three mutually non-parallel translation axes and rotation about the two mutually non-parallel rotation axes; and a second subsystem configured to provide relative translational movement between the first subsystem and the structure being formed. This approach may allow the apparatus to process extremely large structures without the overall apparatus itself needing to be correspondingly large. For example, highly elongate structures can be processed either by feeding the structures through the apparatus using the second subsystem (while the first subsystem is stationary) or by moving the first subsystem relative to the structure using the second subsystem (e.g. by moving the first subsystem along a gantry forming part of the second subsystem).

According to another aspect, there is provided a method of manufacturing a device, comprising: depositing a plurality of filaments to form at least one non-planar layer; depositing one or more functional elements, each functional element comprising an electrically conductive element, an optical fibre or a hollow tube, the deposition being such that at least a portion of the functional element is: a) embedded in and geometrically conforms with one of the non-planar layers, or b) arranged between and geometrically conforms with two of the non-planar layers.

According to another aspect, there is provided a system comprising a first device according to any of the embodiments described above and a second device according to any of the embodiments described above, wherein the non-planar layers of the first device are non-integral with the non-planar layers of the second device, and wherein each of one or more of the functional elements of the first device is coupled to one or more of the functional elements of the second device. Thus, a plurality of the devices may be connected together. This may advantageously facilitate provision of a system in which individual devices can be removed and replaced, without necessarily having to replace all of the devices in the system. This may permit routine repair and maintenance of the system without significant downtime. This may be particularly important in scenarios where downtime is expensive, such as in the aeronautical industry.

Embodiments of the disclosure will now be described, by way of example only, and with reference to the accompanying drawings, in which.

Figure 3:
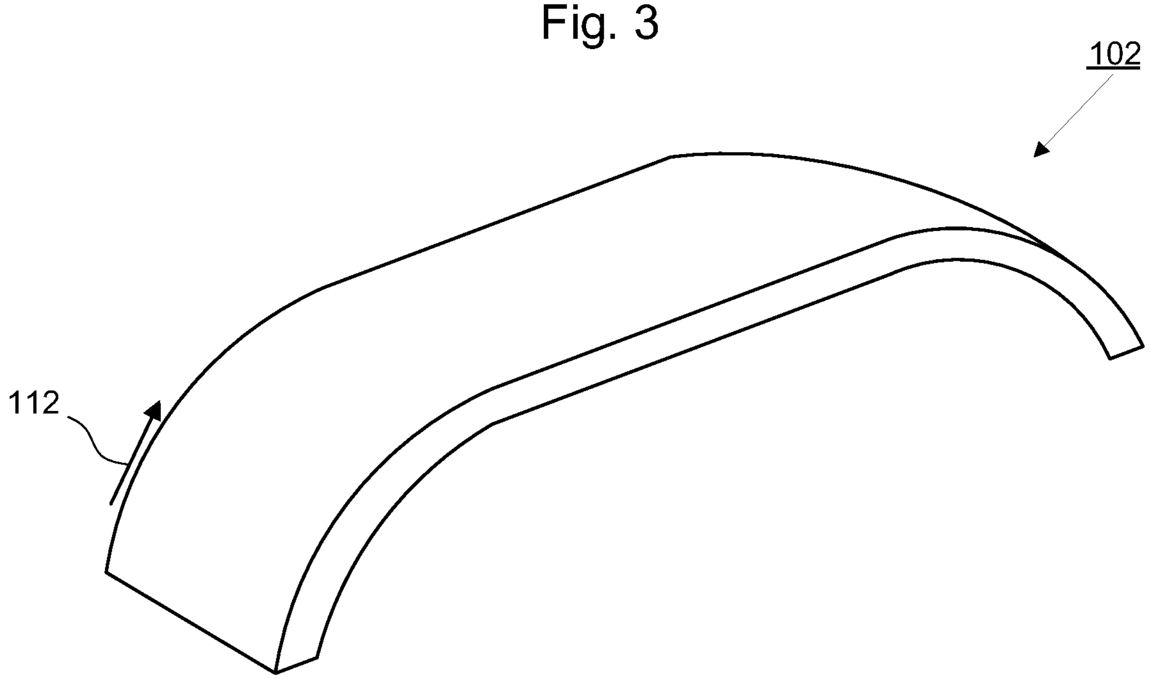
FIG. 3 is a perspective view of a device according to an embodiment.
Figure 6:
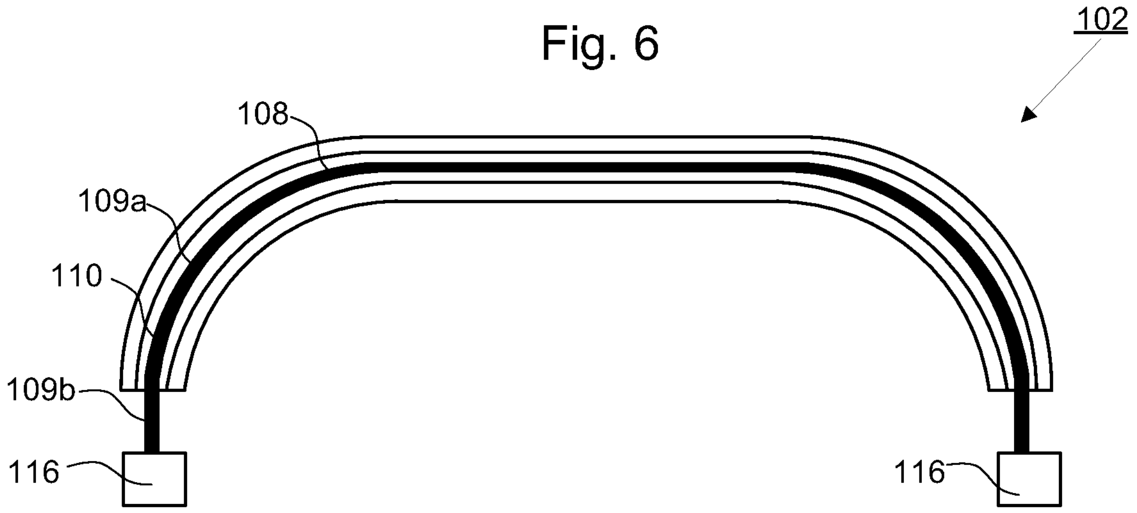
Figure 7:
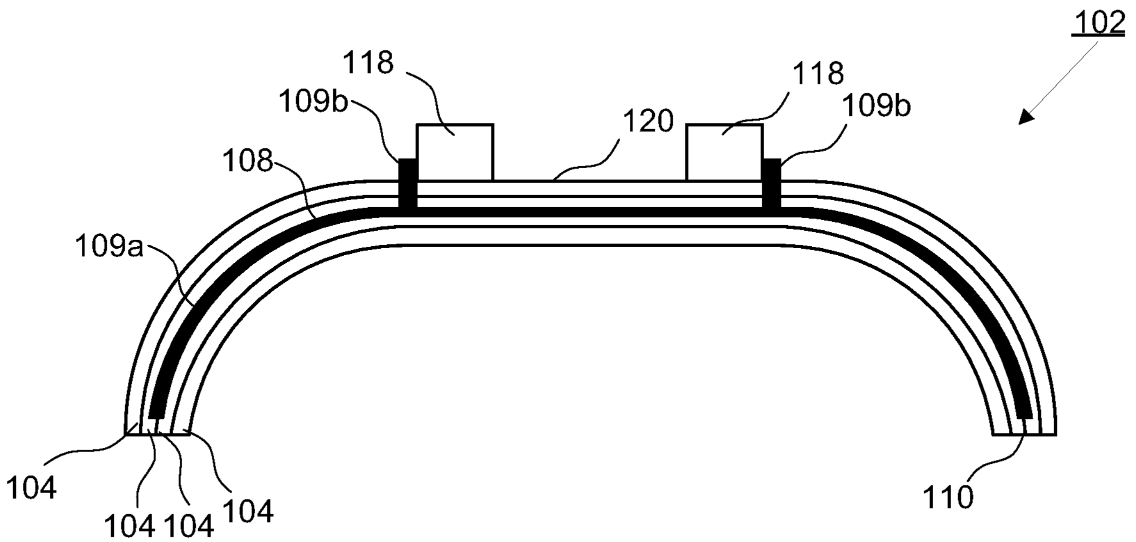
Figure 8A:
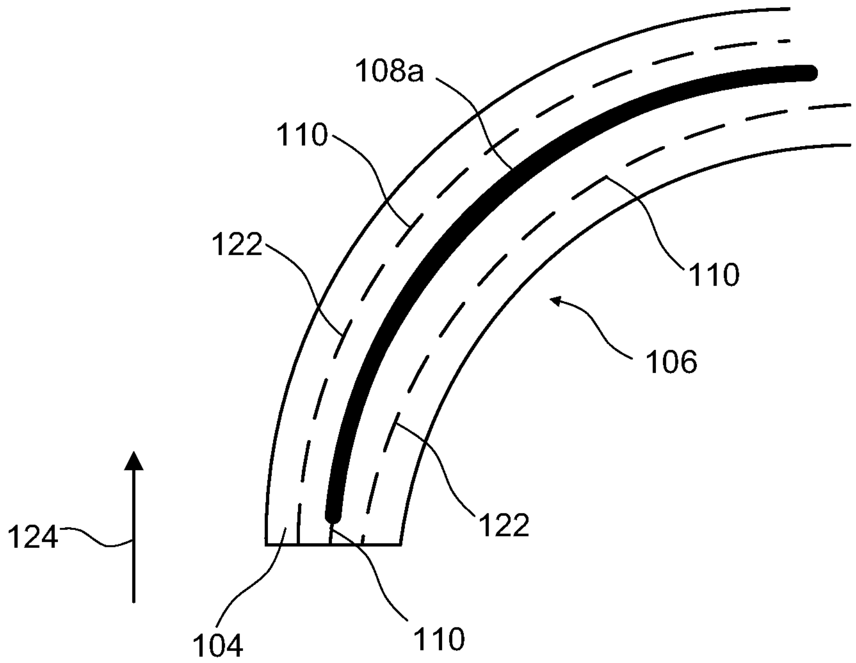
Figure 8B:
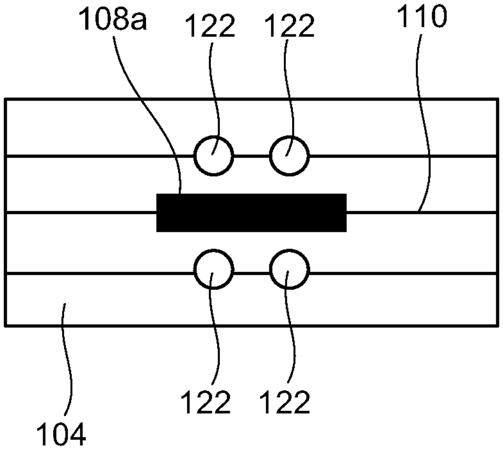

FIGS. 5*a*-5*e* are sectional views through examples of the device of FIG. 3 with different arrangements of functional elements;

FIG. 6 is a sectional view of an example device in which an elongate electrically conductive element comprises further portions which extend away from an interface between non-planar layers;

FIG. 7 is a sectional view of a further example device in which the elongate electrically conductive element comprises further portions which extend away from an interface of the device;

FIG. 8*a* is a sectional view of an example device comprising reinforcing fibres aligned with elongate electrically functional elements;

FIG. 8*b* is a further sectional view of the device of FIG. 8*a;*

Figure 9A:
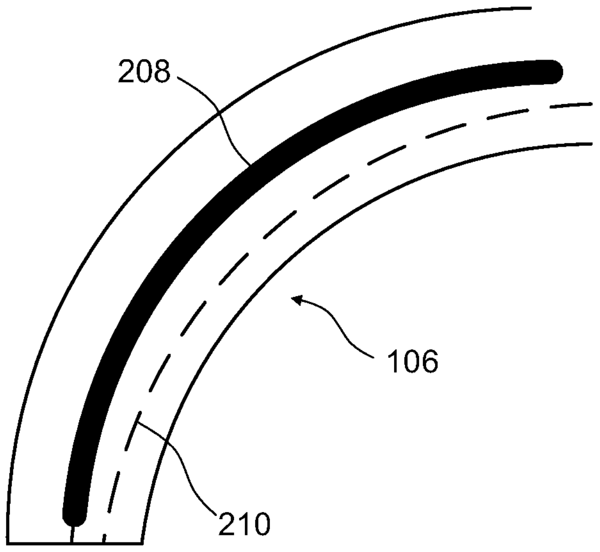
Figure 9B:
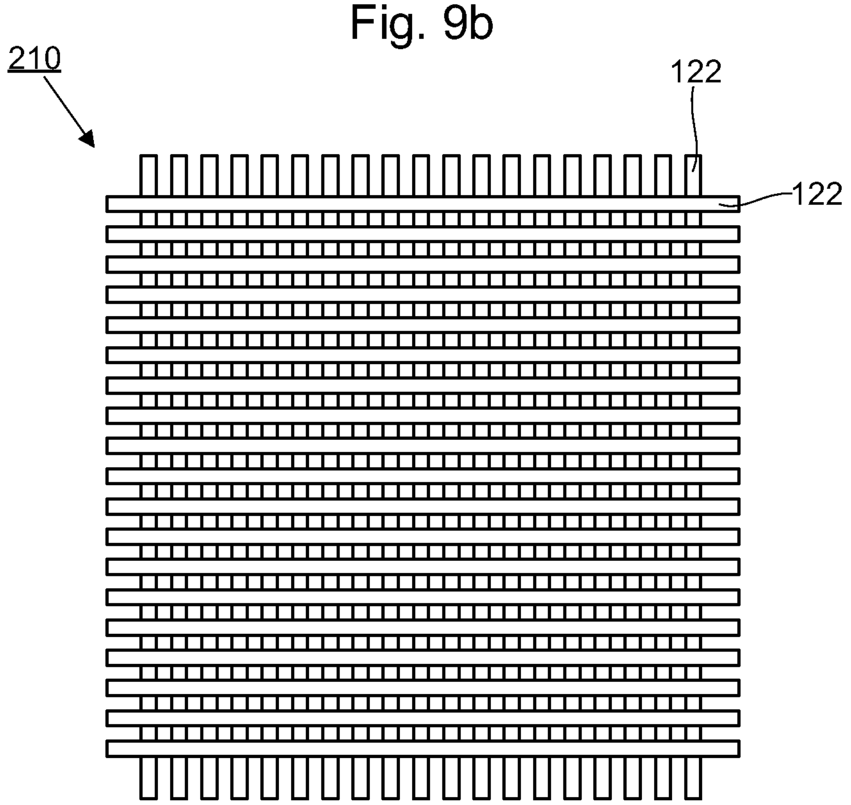

FIG. 9*a* is a sectional view of an example device comprising reinforcing mats for mechanically protecting electrical elements such as surface-mount devices;

FIG. 9*b* is a schematic top view of one of the reinforcing mats of FIG. 9*a;*

Figure 10:
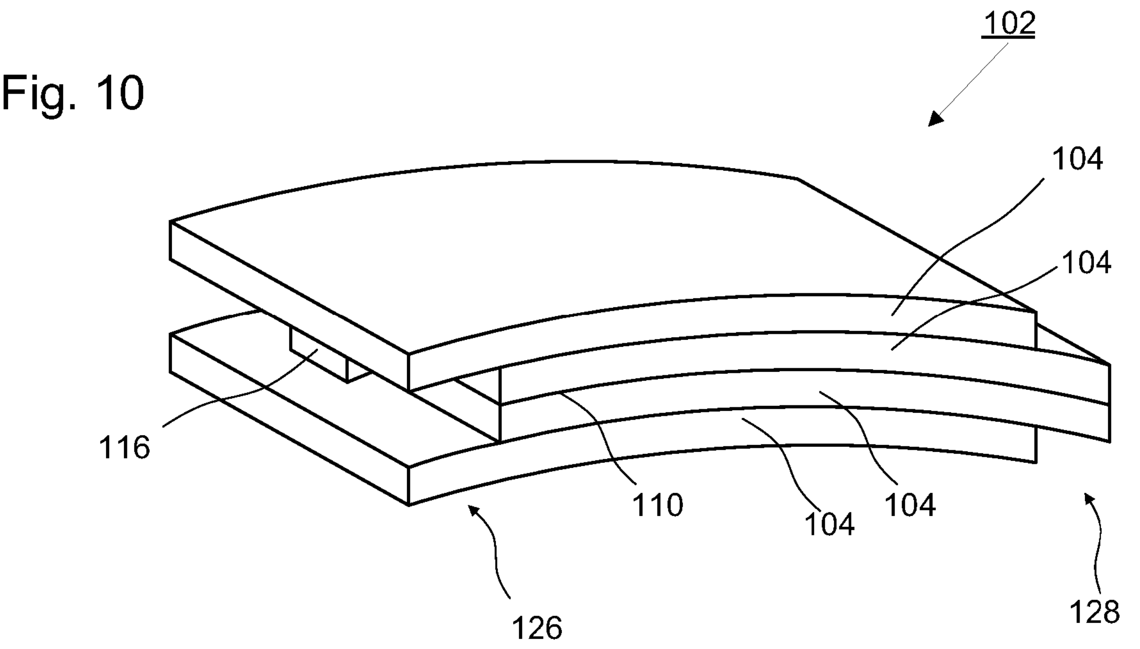
Figure 11:
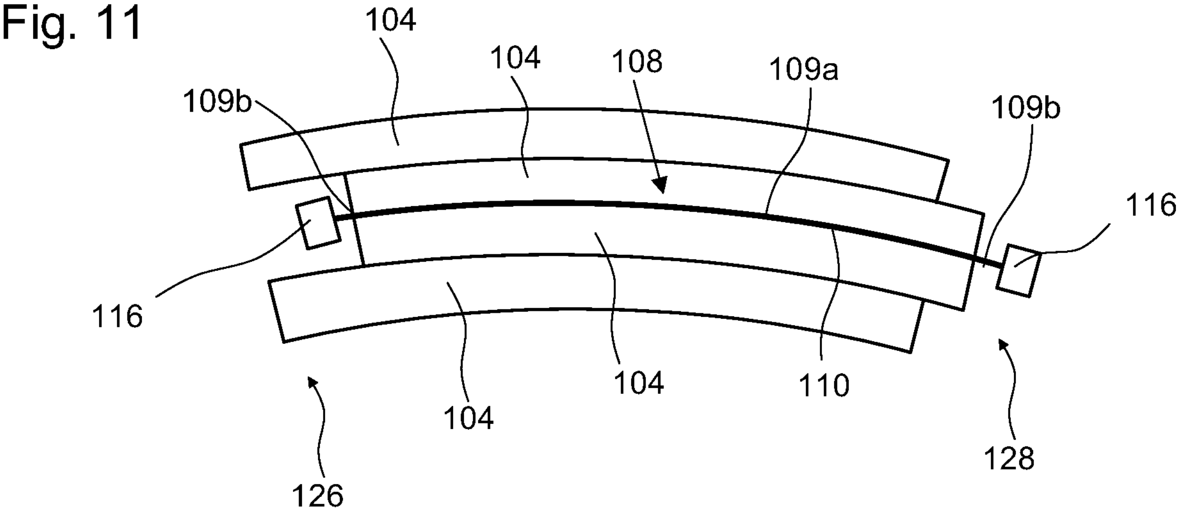
Figure 12A:
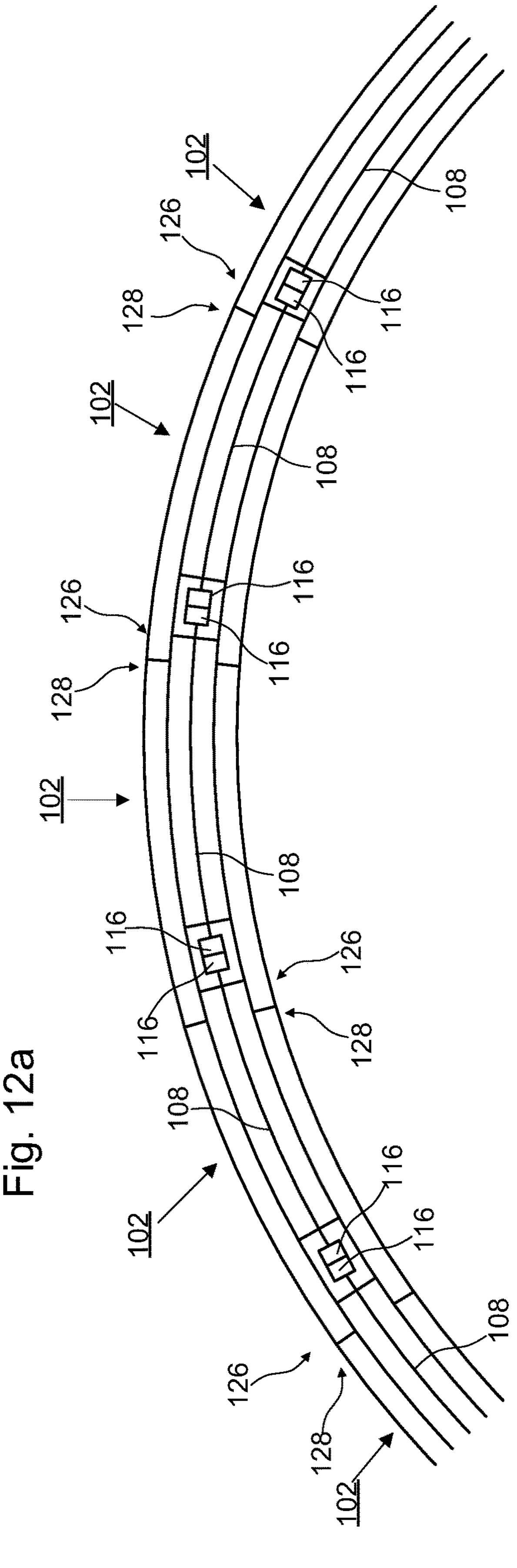
Figure 12B:
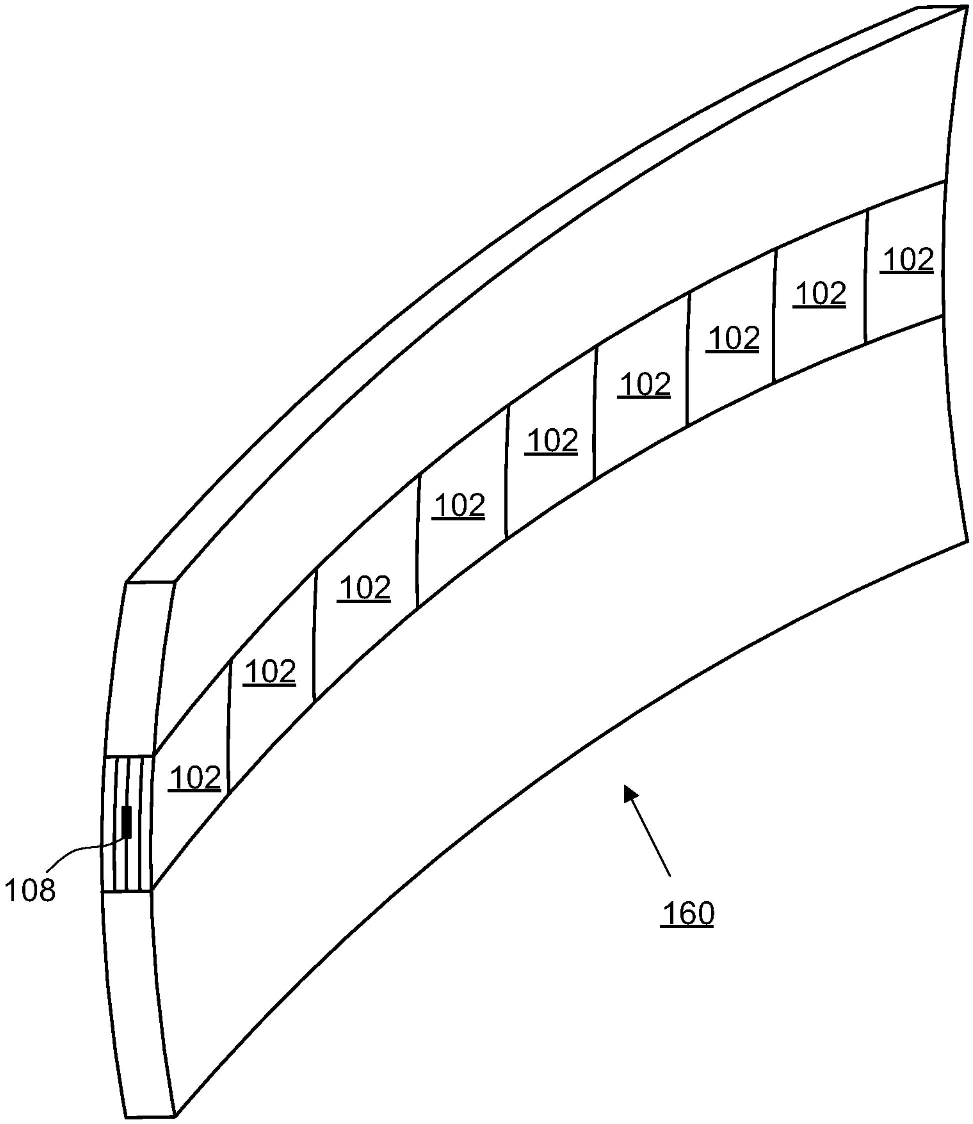
Figure 13:
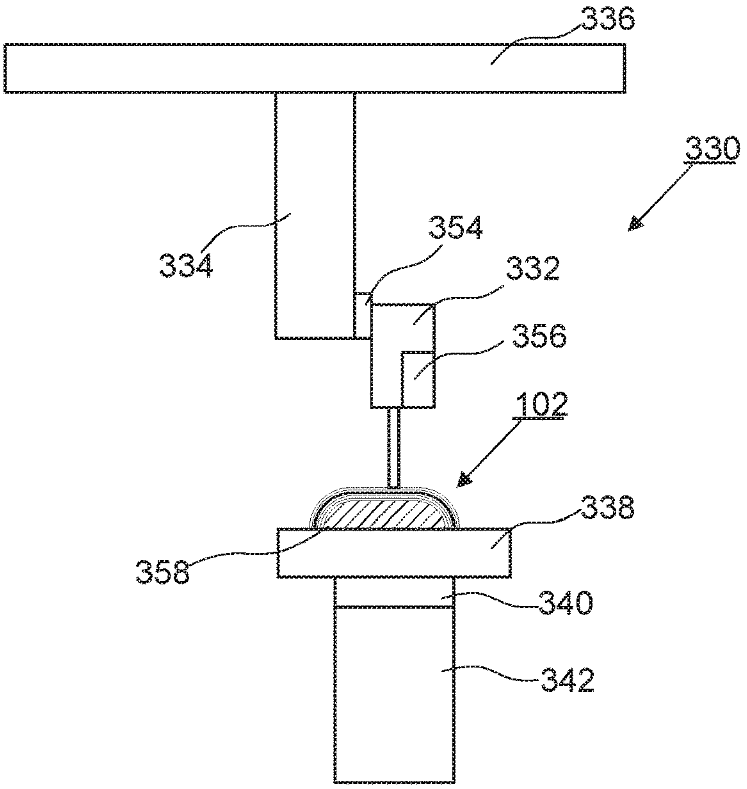
Figure 14:
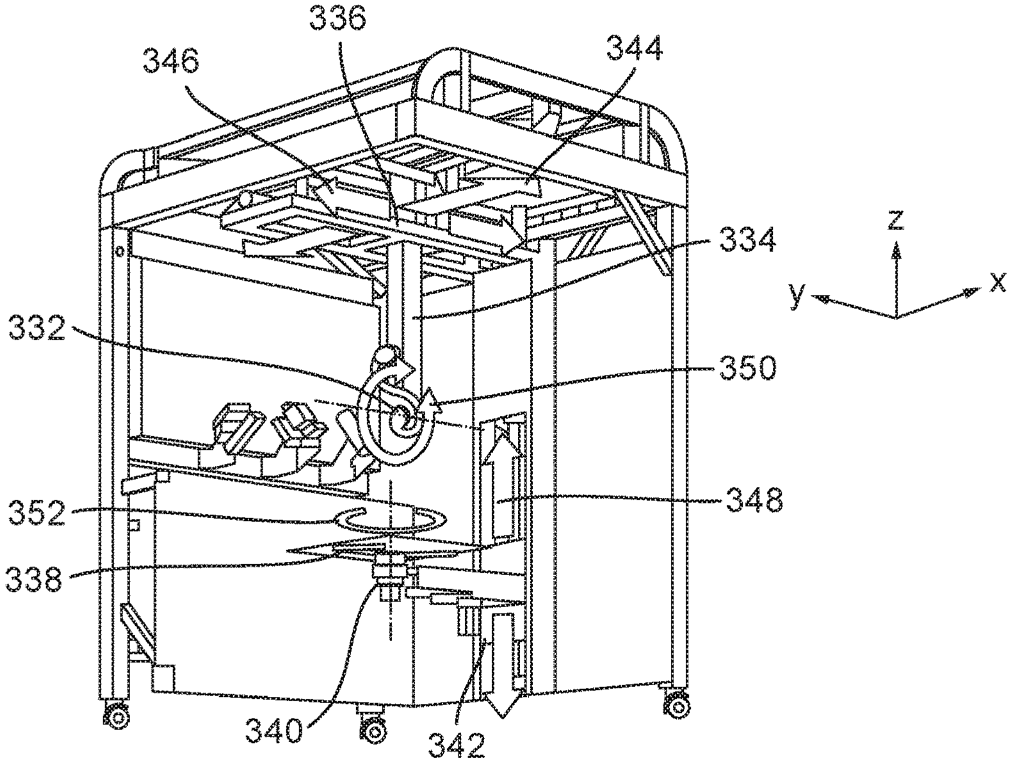
Figure 15:
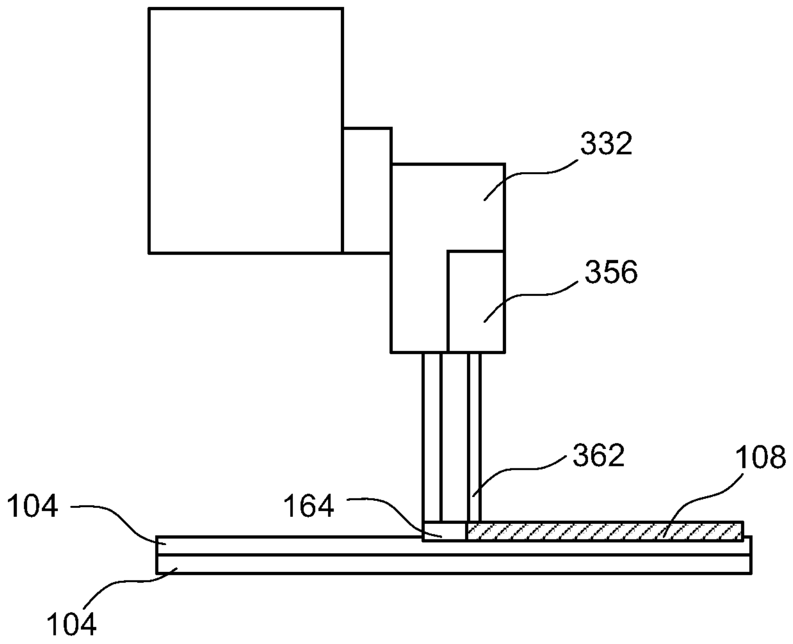
Figure 16A:
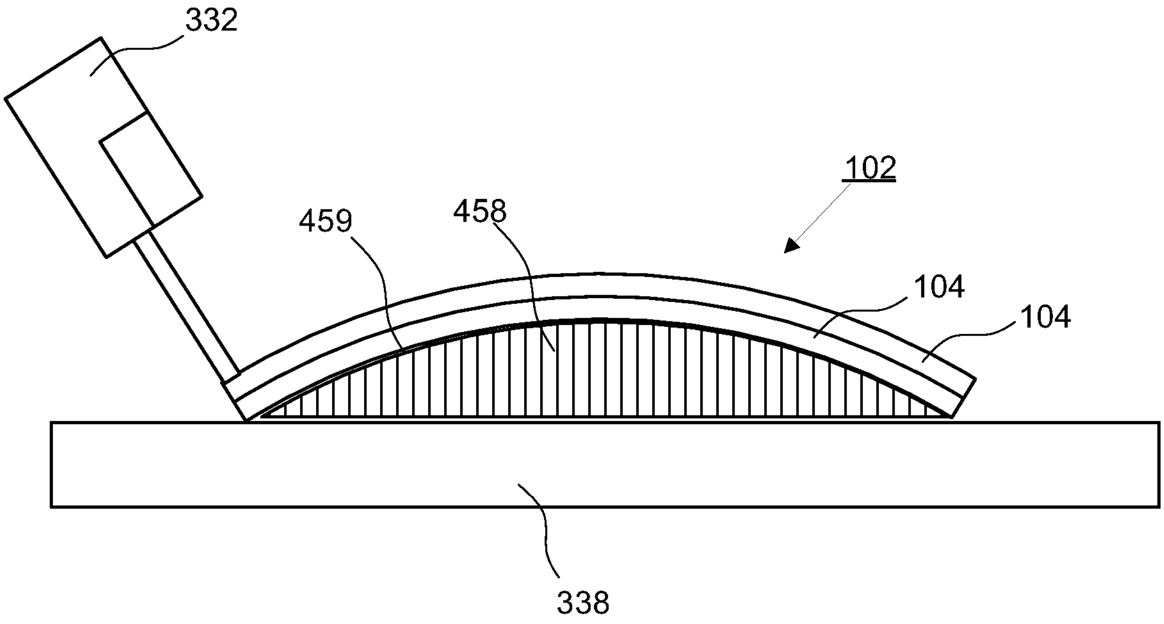
Figure 16B:
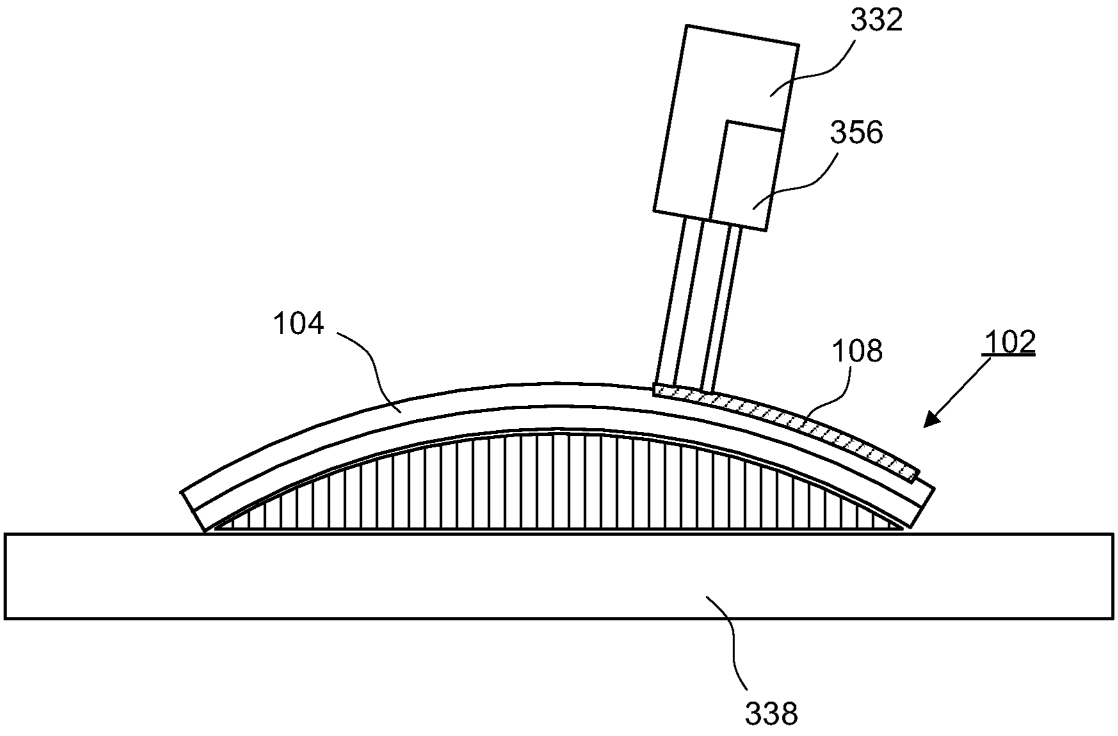
Figure 16C:
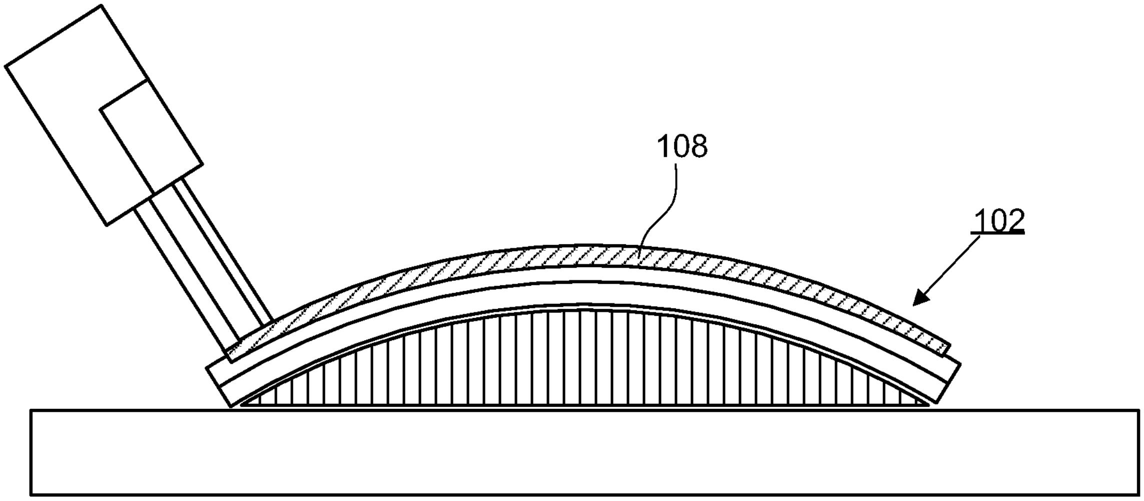
Figure 16D:
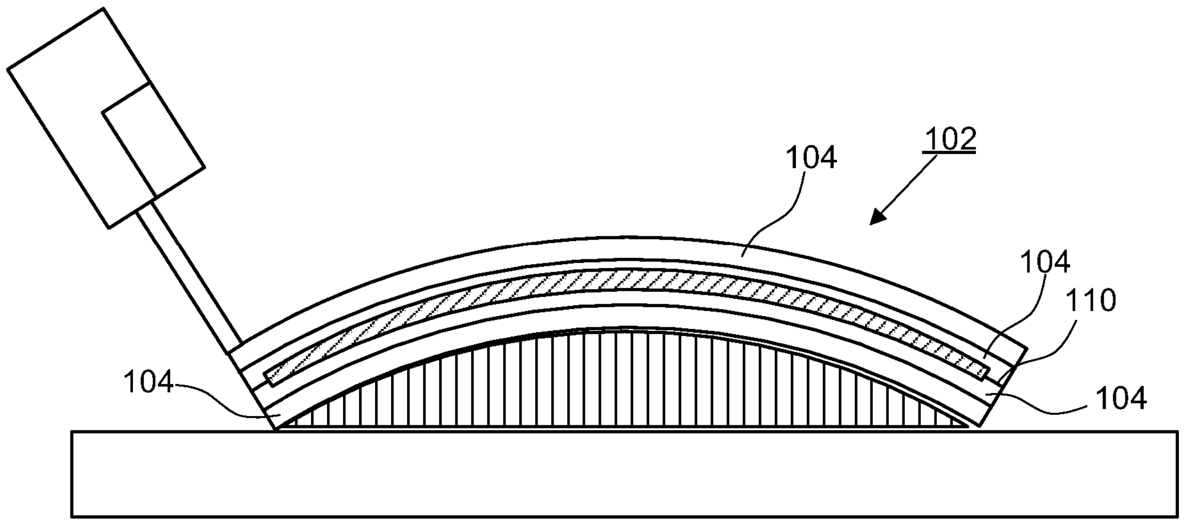
Figure 17:
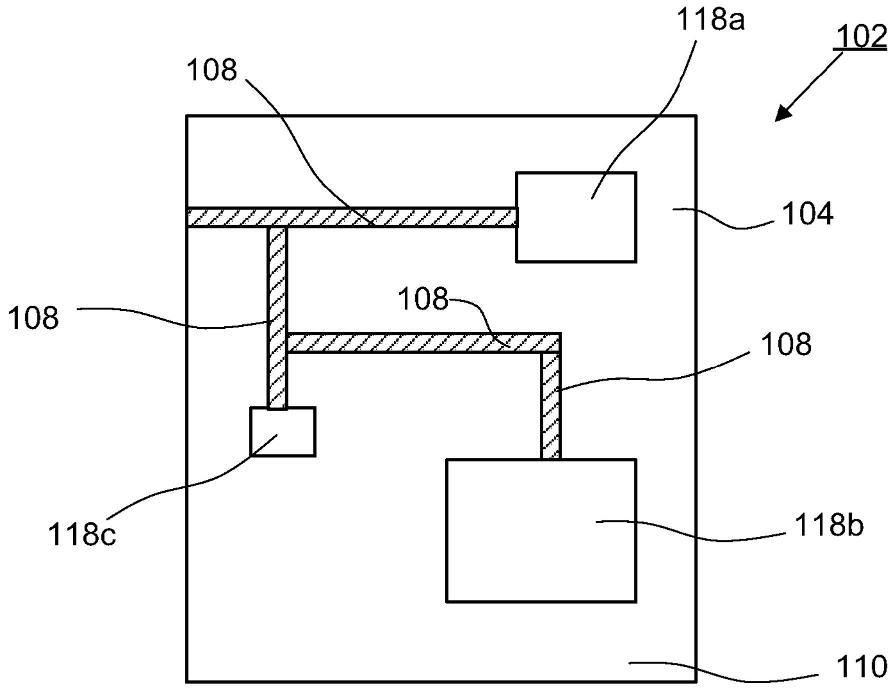

FIG. 10 is a perspective view of further example device;

FIG. 11 is a sectional view of the device of FIG. 10;

FIG. 12*a* is a sectional view of a system comprising a plurality of connected devices;

FIG. 12*b* is a perspective view of the system of FIG. 12*a* incorporated into a panel;

FIG. 13 schematically depicts an apparatus for manufacturing a device;

FIG. 14 is a perspective view of the apparatus of FIG. 13;

FIG. 15 is a schematic illustration showing the depositing of a precursor material and subsequent irradiation with a laser;

FIGS. 16*a*-16*d* illustrate the formation of a device using the apparatus of FIGS. 13 and 14; and FIG. 17 shows a schematic representation of a plurality of elongate electrically conductive elements and a plurality of SMDs at an interface between non-planar layers of an example device.

Figure 1:
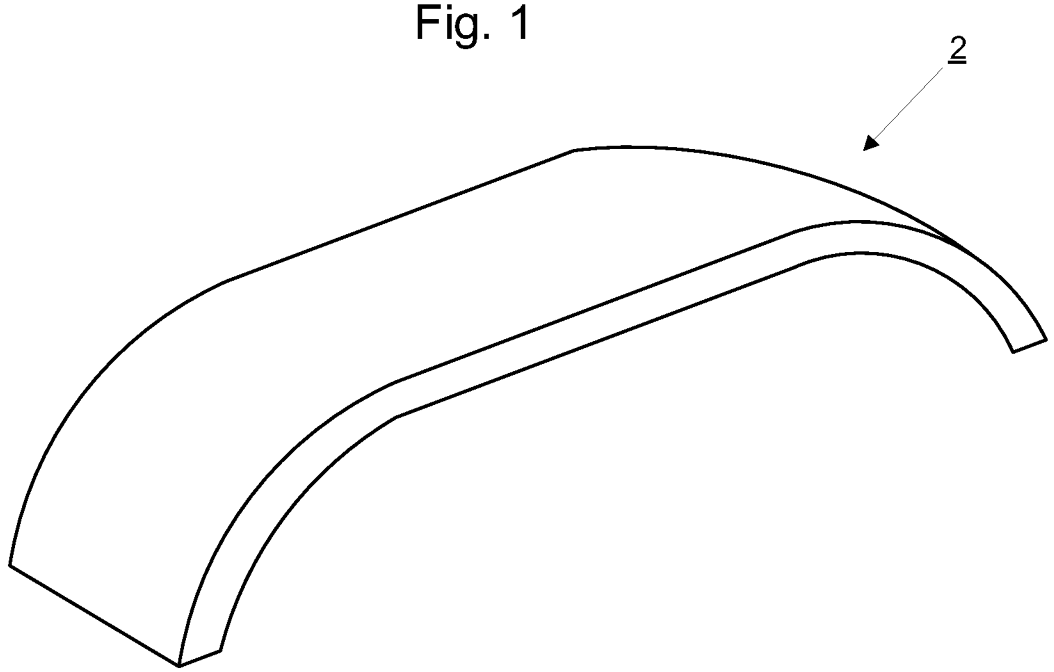
FIG. 1 is a perspective view of a prior art 3D structure.
Figure 2:
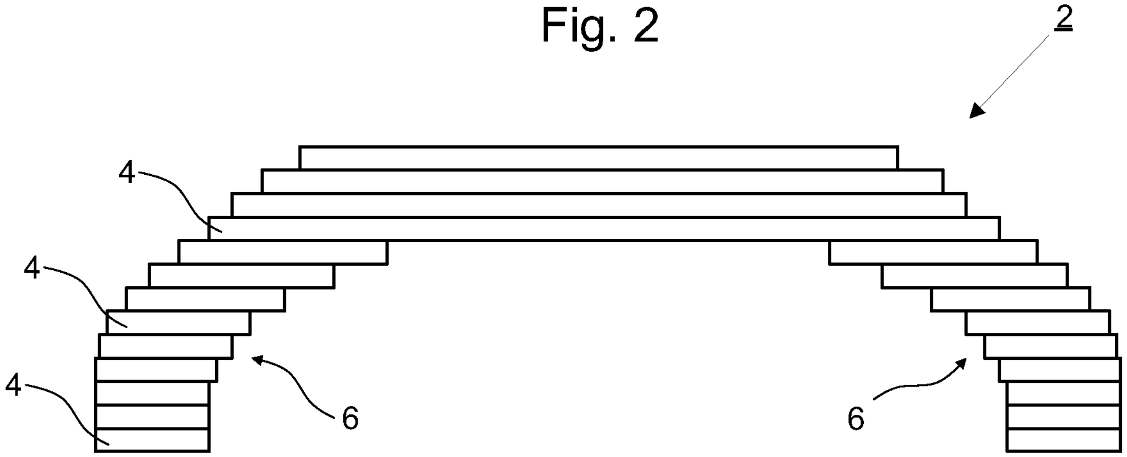
FIG. 2 is a sectional view through the 3D structure shown in FIG. 1.

FIGS. 1 and 2 depict a prior art 3D structure 2. The 3D structure 2 is formed of a plurality of planar layers 4. The planar layers 4 are layered on top of one another and are dimensioned to form the 3D structure. As discussed above, a problem associated with such structures 2 is that individual layers 4 cannot follow the shape of curved portions 6, which leads to stepped outer profiles and structural weakness.

Figure 4:
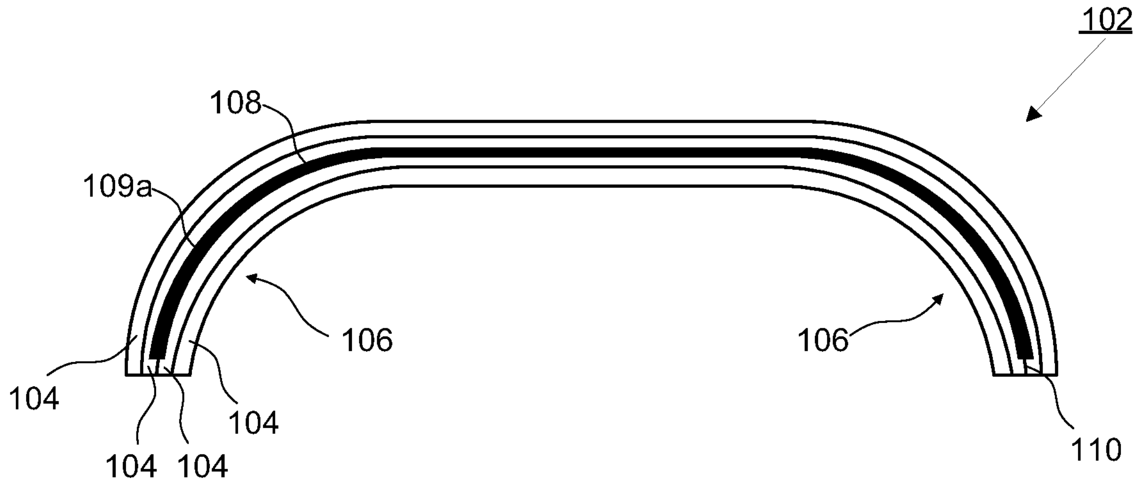
FIG. 4 is a sectional view through the device of FIG. 3.

In some embodiments of the present disclosure, as exemplified in FIGS. 3 and 4, devices 102 are provided that, in contrast to arrangements such as those discussed above with reference to FIGS. 1 and 2, comprise at least one non-planar layer 104. Each non-planar layer 104 is formed of a plurality of filaments deposited by an additive manufacturing technique. In the example of FIGS. 3 and 4, the device 102 comprises a plurality of the non-planar layers 104. The non-planar layers 104 may be formed from a wide range of materials. In some arrangements, the non-planar layers 104 comprise, consist essentially of, or consist of, one or more of the following: a thermoplastic; a two-part epoxy; a ceramic or metallic paste that can be sintered post deposition; a photonically cured resin; and a paste that can be evaporatively dried to form a solid. Thermoplastics may be desirable for some applications as they can be re-melted and separated from the functional elements 108, allowing the plastic to be reused.

The devices 102 further comprise one or more functional elements 108. Each functional element 108 comprises an electrically conductive element, an optical fibre or a hollow tube. Each device 102 may comprise one or multiple instances of a single type of functional element 108, one or multiple instances of two types of functional element 108 (e.g. electrically conductive elements and optical fibres, electrically conductive elements and hollow tubes, or optical fibres and hollow tubes), or one or more instances of all three types of functional element 108. In some embodiments, as exemplified in FIGS. 3 and 4, at least a subset of the functional elements are elongate. The functional element 108 may be aligned with at least one of the filaments forming a non-planar layer contacting the functional element 108. In the particular example of FIGS. 3 and 4, the device 102 comprises a functional element 108 that is an elongate electrically conductive element. The electrically conductive element may be provided in the form of a deposited track or a preformed conductive element such as a wire. Preferably a combination of the two types of electrically conductive element are provided. The electrically conductive element may be metallic. The electrically conductive element may be used for transmission of electrical power and/or data.

Each of one or more of the functional elements 108 may comprise a portion that is embedded in and geometrically conforming with one of the non-planar layers 104. The portion may be embedded in one or more of the filaments forming the non-planar element 104. The portion may be arranged between two filaments which form the non-planar layer 104 (e.g. in direct contact with both of them). The portion may be aligned with the two filaments in this case (with an axis of elongation of the portion of the functional element 108 being parallel to axes of elongation of the contacting filaments). In some embodiments, the portion of the functional element 108 may be thinner than the filaments forming the non-planar layer 104 and may therefore be embedded exclusively in one non-planar layer 104 (i.e. not extend beyond the non-planar layer 104 at all In other embodiments, the portion of the functional element 108 may be of comparable width and/or wider than the filaments and therefore extend beyond the non-planar layer 104 in which it is embedded into one or more adjacent non-planar layers 104. Alternatively or additionally, each of one or more of the functional elements 108 may comprise a portion that is arranged between and geometrically conforming with two of the non-planar layers 104. The functional elements 108 may thus geometrically conform with an interface 110 between the non-planar layers 104. Again, the portion of the functional element 108 in this case may be thinner, of comparable width, or wider than, the filaments forming the non-planar layers 104 that it is between. In the example of FIGS. 3 and 4, substantially all of the functional element 104 corresponds to a portion that is arranged between and geometrically conforms with two of the non-planar layers 104.

A plurality of the functional elements 108 may be provided. Each functional element 108 may have a portion embedded in and geometrically conforming with a different respective one of the non-planar layers 104. Alternatively or additionally, each functional element 108 may have a portion embedded between and geometrically conforming with a different respective pair of adjacent non-planar layers 104.

In the example of FIGS. 3 and 4, the functional element 108 comprises a portion 109*a* at an interface 110 between two of the non-planar layers 104 and geometrically conforming with the interface 110. The functional element 108 is not visible in FIG. 3 because the functional element 108 is embedded internally within the layers 104 and does not, in this depicted embodiment, extend to the edge of the device 102.

In contrast to the arrangement of FIGS. 1 and 2, the non-planar layers 104 of FIGS. 3 and 4 can follow the curve of the curved portions 106. This may improve the strength of the device 102, particularly in the curved portions 106. Further, the layered non-planar layers 104 allow the functional element 108 to follow curved paths with less or no stepping through different layers of the structure. The functional element 108 can follow the curve while remaining at the relatively smooth interface 110 between different non-planar layers 104. This approach may be particularly advantageous where the functional element 108 takes the form of a printed track, which may be difficult to form reliably along a stepped curved path such as that depicted in FIG. 2.

Providing functional elements 108 in the non-planar layers 104 (which may form a rigid solid structure) in the manner described provides improved mechanical support for the functional element 108 as well as opening up the possibility of using predictive tools such as finite element analysis. Tools such as finite element analysis can help to ensure matching between the mechanical properties of the device and the practical requirements of the application for which the device is intended. The risk of unreliability or over engineering can be reduced or avoided. The approach may be particularly suitable in safety critical applications such as in the automotive and aeronautical sectors.

The device 102 may be configured to form all or part of a wiring harness, which is sometimes referred to as a cable assembly, wire loom, or wiring assembly. In this case the functional elements 108 of the device 102 would at least comprise one or more electrically conductive elements. The electrically conductive elements may be used to perform any of the functions commonly associated with wiring harnesses, such as transmitting electrical signals and/or power. The device 102 may be used in a range of applications including, for example, in a vehicle, aircraft, industrial equipment, construction machinery, white goods, data communications related equipment, and electro-mechanical components.

Electrically conductive elements (e.g. wires) in prior art wiring harnesses are often sized to achieve a required mechanical strength rather than for the desired electrical properties. Harnesses are made by hand and installed by hand and can be relatively exposed during normal use. Furthermore, the harnesses may need to last a long time without replacement. All of these factors may lead to wire thickness being selected that are significantly larger than is necessary for achieving the desired electrical properties. Providing electrically conductive elements in a solid structure avoids these issues and allows the electrically conductive elements to be considerably finer. This may reduce the weight of the device 102 compared to prior art wiring harnesses with comparable electrical functionality. Further, the finer gauge may mean that smaller terminations and other fixtures can be used. This may be particularly beneficial in aerospace applications where the total weight of wiring may be measured in tonnes or in automotive applications where the weight may be comparable with the weight of an adult human passenger.

With prior art wiring harnesses, arc faults often occur due to the degradation of insulation around the wires. The arcing can lead to charring or burning of the insulation and surrounding materials at temperatures of around 5000° C. Failures also occur in terminals, either due to corrosion or mechanical stress and vibration. Additionally, poor routing and support of the wiring harness in situ can cause chaffing, either against other wires in the bundle or the component to which the wiring harness is attached. Many faults are also caused during maintenance where the stress of handling breaks brittle insulation. Providing the functional elements 108 in the structure of non-planar layers reduces these issues by preventing relative movement between the functional elements 108. The approach also involves fewer interfaces and may therefore reduce the risk of unwanted fluid ingress and associated electrical problems or corrosion.

The structure of the device 102 (with functional elements 108 mechanically supported by the non-planar layers) lends itself to meaningful mechanical and electrical testing, which can determine with high predictive accuracy how the device 102 will react to vibration, stress and/or fluids. The device 102 may be altered in response to the testing to optimise the design. It is difficult to perform such testing and/or design optimisation to the same level of accuracy with the mechanically more complex and variable structures of prior art wiring harnesses.

Another advantage of the device 102 is that it can be designed using computer-aided-design (CAD) and/or computer-aided-manufacture (CAM). The use of CAD/CAM allows complex structures to be formed repeatedly and accurately.

FIGS. 5*a*-5*e* show cross-sections of different implementations of the device of FIGS. 3 and 4 viewed along direction 112 (shown in FIG. 3).

Figure 5A:
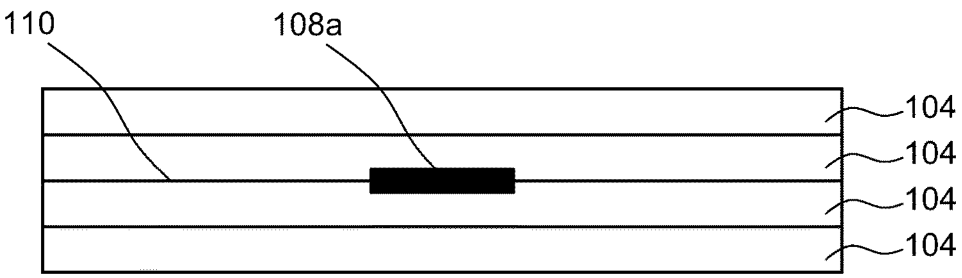

In the example of FIG. 5*a*, the functional element 108 comprises a deposited track 108*a*. The deposited track 108*a* may be deposited during the formation of the layers 104 during the additive manufacture process. The deposited track may be in the form of a printed track which may be achieved using ink-jetting or by a paste extruder. The deposited track 108*a* may form an electrically conductive element that is isolated from the rest of the device 102 by the non-planar layers 104. The non-planar layers 104 may be formed from an electrically insulating material.

Figure 5B:
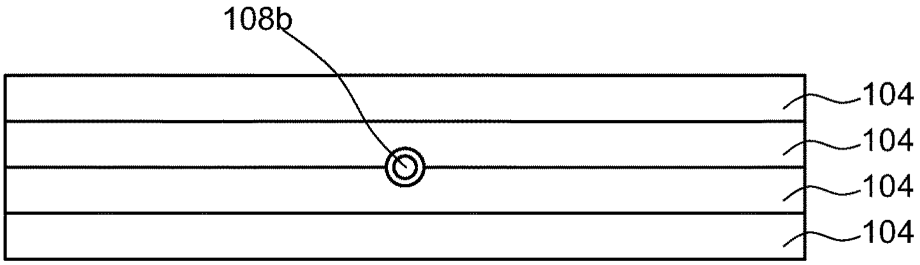

In the example of FIG. 5*b*, the functional element 108 comprises a preformed conductive element in the form of a wire 108*b*. The wire 108*b* may be a sheathed wire, as depicted, and thus not require the layers 104 necessarily to be formed from an insulating material. The wires 108*b* may have a metal core of any gauge. The wire 108*b* may comprise multiple cores, screening, armoring and/or insulation. However, in some embodiments the wire 108*b* may be a bare, unsheathed, wire, and insulation of the wire 108*b* may be achieved by the layers 104 being formed from an electrically insulating material.

Figure 5C:
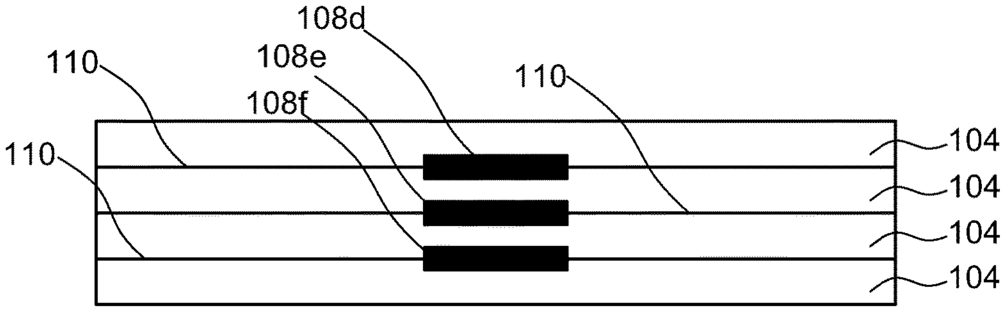

In the example of FIG. 5*c*, the device 102 comprises a plurality of the functional elements 108 in the form of a plurality of elongate electrically conductive elements. In the example shown, three elongate electrically conductive elements 108*d*, 108*e*, 108*f* are provided at different interfaces 110 between non-planar layers 104. Each of the electrically conductive elements 108*d*, 108*e*, 108*f* geometrically conforms with the interfaces 110. In the example shown, the three electrically conductive elements 108*d*, 108*e* and 108*f* are aligned relative to each other in a direction perpendicular to the non-planar layers 104. The electrically conductive elements 108*d*, 108*e* and 108*f* may be separate from each other and/or electrically isolated from each other. It is, however, also possible to provide a single electrically conductive element that has portions conforming with different interfaces 110. For example, instead of being separate elongate conductive elements 108*d*, 108*e*, 108*f*, as described above, the portions labelled 108*d*, 108*e*, 108*f* in FIG. 5*c* could correspond to different portions of the same electrically conductive element. Where multiple electrically conductive elements are provided, any two or more of the electrically conductive elements may be electrically connected to one another, e.g. through vias through the layers 104.

Figure 5D:
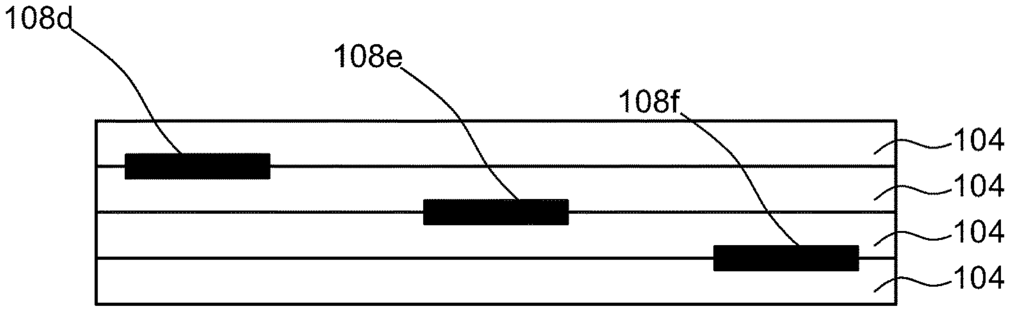

In the example of FIG. 5*d*, the functional elements 108 comprise plural elongate electrically conductive elements 108*d*, 108*e*, 108*f* that are at different interfaces (like in FIG. 5*c*) but are not aligned with each other in the direction perpendicular to the non-planar layers 104.

Figure 5E:
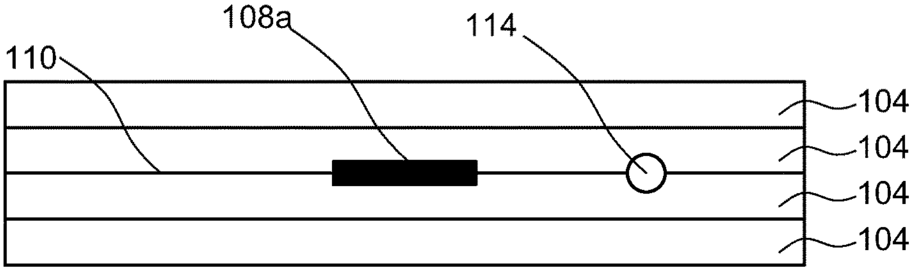

FIG. 5*e* shows a variation on the arrangement of FIG. 5*a* in which the functional elements 108 further comprise an optical fibre 114. In other examples, the functional elements 108 may exclusively comprise optical fibres 114 (i.e. without any other type of functional element 108). The optical fibre 114 has a portion at an interface 110 between two of the non-planar layers 104 and geometrically conforming with the interface 110. In this embodiment, the optical fibre 114 is arranged at the same interface 110 as the deposited track 108*a*. The optical fibre 114 may be provided at a different interface 110. The optical fibre 114 may be connected to a coupling device to enable to the optical fibre 114 to be coupled to another optical element, such as a further optical fibre.

Optical fibres are mechanically fragile, with a common failure mode being a fracture of some type. Providing the optical fibre 114 in the solid structure formed from the non-planar layers 104 provides mechanical support and protection to the optical fibres in the same manner as described above for the case where the functional elements 108 comprise electrically conducting elements. The advantages derived from the ability to use finite element analysis, as well as advanced testing and optimisation strategies, also apply.

The optical fibre 114 may take any of the well-known forms used in the art to implement optical fibres, including use of glass and/or polymers in their manufacture. The normal advantages of optical fibres may be obtained, including implementation of high-bandwidth and/or long distance data transmission. The optical fibre 114 may also be configured to function as a sensor to monitor strain, temperature, pressure or refractive index, or to transmit light for optics. When configured as a sensor, the optical fibre 114 may be used to sense the refractive index of its environment, allowing it to be used to detect fluids or chemical changes. The use of optical fibres 114 may be particularly important in environments with a high level of electrical or magnetic noise, for example in MRI scanners. In some embodiments, the optical fibre 114 may be used to transmit light for illumination, signalling, or even decoration.

FIG. 6 depicts an example device 102 in which, in addition to a portion 109*a* of a functional element 108 being at an interface between two of the non-planar layers 104 and geometrically conforming with the interface 110, the device 102 comprises a further portion 109*b* extending beyond the interface 110. In the example shown, the further portion 109*b* connects to a coupling device 116. In the case where the functional element 108 is an electrically conductive element the coupling device 116 may be configured to allow an electrical connection to be made to the functional element. The coupling device 116 may thus be an electrical connector. The coupling device 116 may comprise a termination, for example in the form of a knife-edge connector. Alternatively, the coupling device 116 may be a device suitable for allowing a connection to be made to the functional element by soldering, e.g. by laser soldering. In the case where the functional element 108 is an optical fibre the coupling device 116 may be an optical connector.

FIG. 7 depicts an example device 102 in which a further portion 109*b* of a functional element 108 extends away from an interface 110 along which the functional element 108 extends. The further portion 109*b* passes through one or more layers 104 of the device 102.

In some embodiments, as exemplified in FIG. 7, the device 102 further comprises an SMD 118. The SMD 118 is electrically connected to one or more functional elements 108 that comprise electrically conductive elements. In the example of FIG. 7, the SMD 118 is connected to the further portion 109*b* of the functional element 108. The SMD 118 may be arranged on an outer surface 120 of the device 102 (as shown) or within the device 102 (e.g. at an interface 110 between two non-planar layers 104 or, if thin enough, entirely within one of the non-planar layers 104). The SMD 118 may comprise a wide range of electrical components, including any electrically functional element that is more complex than a simple wire, including both passive and active electronic devices. The SMD 118 may comprise a sensor or microchip. The SMD 118 may be formed by printing. Providing the SMD 118 in the solid structure formed from the non-planar layers 104 provides mechanical support and protection to the SMD 118 in the same manner as described above for the case where the functional elements 108 comprise electrically conducting elements or optical fibres. The advantages derived from the ability to use finite element analysis, as well as advanced testing and optimisation strategies, also apply.

In some embodiments, as exemplified in FIGS. 8*a*, 8*b*, 9*a* and 9*b*, the device 102 further comprises one or more elongate reinforcing fibres 122. Each of one or more of the reinforcing fibres 122 may be embedded in and geometrically conform with one of the non-planar layers 104. Alternatively or additionally, each of one or more of the reinforcing fibres 122 may be arranged between and geometrically conform with two of the non-planar layers 104. The reinforcing fibres 112 may be provided in any of the configurations described above in relation to the functional elements 108. The reinforcing fibres 122 may have a portion at an interface 110 between two of the non-planar layers 104 and geometrically conforming with the interface 110. In some embodiments, a plurality of the elongate reinforcing fibres 122 are provided which geometrically conform with one or more of the non-planar layers 104, and wherein a majority of the elongate reinforcing fibres 122 are substantially aligned with each other over a majority of their length. In some embodiments, each of one or more of the reinforcing fibres is adjacent to and/or aligned with a respective elongate portion of one of the functional elements. In the example of FIG. 8*a*, reinforcing fibres 122 are provided at an interface 110 between different layers 104 and geometrically conform with the interface 110. At least a subset of the elongate reinforcing fibres 122 may be substantially aligned with each other over a majority of their length. The reinforcing fibres 122 may have good tensile properties to improve the strength of the device 102 in a specific direction. The reinforcing fibres 122 may improve the strength of the device in a local region near the reinforcing fibres 122. The reinforcing fibres 122 may thus protect functional elements adjacent to the reinforcing fibres 122. The reinforcing fibres 122 may be formed from any material suitable for providing a desired mechanical reinforcement, including for example one or more of the following: carbon; glass; Aramid; metals such as a steel or aluminium alloy. The reinforcing fibres 122 may be single strand or multi-core (e.g. braided or weaved).

FIG. 8*b* shows a sectional view through the device 102 of FIG. 8*a*, when viewed from the lower end of the curved portion 106 along the direction indicated by arrow 124. In this example, the functional element 108 comprises an elongate electrically conductive element in the form of a deposited track 108*a*, similar to the example of FIG. 5*a*. In this example, four reinforcing fibres 122 (two above and two below) are provided adjacent to the deposited track 108*a* and aligned with an elongate portion of the deposited track 108*a*. The four reinforcing fibres 122 protect the deposited track 108*a* from damage caused by stresses applied to the device.

As exemplified in FIGS. 8*a* and 8*b*, each of one or more of the elongate reinforcing fibres may be is adjacent to and/or aligned with a respective elongate portion of one of the functional elements.

FIGS. 9*a* and 9*b* depict a variation on the arrangement of FIGS. 8*a* and 8*b* in which a plurality of the reinforcing fibres 122 having different orientations are provided in the form of a strengthening mat 210. The strengthening mat geometrically conforms with the non-planar layers 104 above and below the mat. The orientations of the reinforcing fibres 122 provides stiffness along multiple directions. In the example shown, the reinforcing fibres 122 forming the strengthening mat comprise two sets of parallel reinforcing fibres 122 that are aligned orthogonally to each other. The reinforcing fibres 122 provide stiffness in the directions of alignment of the two sets (horizontal and vertical in the orientation of FIG. 9*b*). In other embodiments, the reinforcing fibres may be provided with a wider variety of alignments. The strengthening mat 210 improves reliability by allowing an extended region to be protected from strains. In the example shown, the strengthening mat 210 is used to protect a complex circuit pattern 208 comprising printed tracks and SMDs.

In some embodiments, a system comprising a plurality of the devices 102 is provided. The system may thus comprise first device 102 (taking any of the forms described herein for the device 102) and a second device 102 (taking any of the forms described herein for the device 102). The non-planar layers of the first device 102 are non-integral with the non-planar layers of the second device 102. Each of one or more of the functional elements 108 of the first device 102 is coupled to one or more of the functional elements 108 of the second device 102. The coupled functional elements 108 may comprise coupled electrically conductive elements, in which case the coupling allows an electrical signal to be sent between the first and second devices 102 via the coupled electrically conductive elements. Alternatively or additionally, the coupled functional elements 108 may comprise coupled optical fibres, in which case the coupling allows an optical signal to be sent between the first and second devices 102 via the coupled optical fibres. The first and second devices 102 may furthermore each comprise a mechanical coupling arrangement configured to mechanically couple the first and second devices together 102.

FIGS. 10 and 11 depict an example device 102 suitable for implementing the system mentioned above. The device 102 may form the first device 102 and/or the second device 102 mentioned above. In the example shown, the device 102 comprises four non-planar layers 104 forming a layered structure. A functional element 108 is provided at an interface 110 between the central two layers 104 and comprises a portion 109*a* at the interface 110 and two further portions 109*b* extending away from the interface 110. A coupling device 116 is attached at each end of the further portions 109*b*. In some embodiments, the device 102 comprises a female connector 126 and a male connector 128. The female connector 126 and male connector 128 are each a mechanical coupling arrangement. In the embodiment shown in FIGS. 10 and 11, the female connector 126 and male connector 128 are defined by complementary shapes formed by the layers 104. The complementary shapes of the female connector 126 and the male connector 126 allow two of the devices 102 to be mechanically coupled together. The mechanical coupling is such that the functional element 108 in one of the devices 102 is coupled (e.g. electrically coupled or optically coupled, depending on the nature of the functional element 108) to the functional element 108 in the other device 102 via a coupling device 116. The mechanical coupling may take any suitable form and need not necessarily be integrally formed by each device 102. In some arrangements, the mechanical coupling is at least partly implemented by a separate member that can be attached to two of the devices 102 at the same time (thereby connecting the two devices 102 together).

FIG. 12*a* shows a system formed from devices 102 such as those described above with reference to FIGS. 10 and 11. The layers of the different devices 102 are non-integral with each other. The functional elements 108 are all connected together via the coupling devices 116 to provide a continuously connected functional element running through all of the devices 102.

The system of multiple interconnected devices 102 described above with reference to FIGS. 10-12*a* can be incorporated into a range of structures according to requirements. FIG. 12*b* depicts an illustrative example in which the system is incorporated into a panel 160. The panel 160 may form part of a vehicle such as aircraft, lorry or car.

The modular nature of the system of interconnected devices 102 provides improved flexibility and/or facilitates maintenance. Individual devices 102 may be removed and replaced without disrupting other devices.

FIGS. 13 and 14 depicts an example apparatus 330 for manufacturing a device 102 according to the disclosure. The apparatus 330 may be used to manufacture any of the devices 102 discussed above. The apparatus 330 comprises a deposition module 332. The deposition module 332 progressively deposits filaments to form a structure comprising at least one layer. The progressive deposition of material may comprise an additive manufacturing process. The apparatus 330 is also configured to deposit one or more functional elements 108. As described above, each functional element 108 comprises an electrically conductive element, an optical fibre or a hollow tube. The functional elements 108 are embedded within one of the layers 104 or arranged between two of the layers 104. Each of one or more of the functional elements 108 may be provided at an interface 110 between a pair of the layers 104. The apparatus 330 comprises a spatial manipulation system configured to allow relative movement between a holder 338 for holding a structure being formed and at least a portion of the deposition module 332. The relative movement includes translation relative to three mutually non-parallel (e.g. orthogonal) translation axes and rotation about two mutually non-parallel (e.g. orthogonal) rotation axes during either or both of the progressive deposition of material and the deposition of the one or more functional elements. The spatial manipulation system may comprise a first subsystem configured to provide the translation relative to the three mutually non-parallel translation axes and rotation about the two mutually non-parallel rotation axes, and a second subsystem configured to provide relative translational movement between the first subsystem and the structure being formed.

In some embodiments, a temperature-controlled chamber encloses the deposition module 332 and the holder 338 to allow the ambient temperature around the structure being formed to be controlled.

In the example of FIGS. 13 and 14, the deposition module 332 is mounted on an arm 334 which is connected to an x-y translation stage 336. The x-y translation stage 336 allows the arm 334, and thus the deposition module 332 attached thereto, to be moved in an x direction illustrated by arrow 344 and in a y-direction illustrated by arrow 346, thereby providing two orthogonal translation axes.

The holder 338, which supports the device 102 as it is being formed, is arranged on a first rotational stage 340 which is operatively connected to a z-height, i.e. vertical height, translation stage 342. As depicted by the arrow 348, the z-height translation stage 342 allows the holder 338 to be moved vertically up and down in the z-direction, thereby providing a third orthogonal translation axis.

The first rotational stage 340 is configured to allow the holder 338 to rotate relative to the deposition module 332. In the embodiment depicted, the first rotational stage 340 permits rotation in a plane orthogonal to the z-axis and parallel to the x and y axis. The rotation is illustrated by the arrow 352.

A second rotational stage 354 is arranged between the deposition module 332 and the arm 334. The second rotational stage 354 allows rotation of the deposition module 332 in a plane parallel to the z-axis and orthogonal to the x and y axis. In the embodiment depicted, the second rotational stage 354 allows the deposition module 332 to rotate in the direction illustrated by the arrow 350. The second rotational stage 354 therefore permits rotation of the deposition module 332 relative to the holder 338.

Accordingly, in the embodiment shown in FIGS. 13 and 14, the manipulation system comprises the x-y translation stage 336, the z-height translation stage 342, the first rotational stage 340 and the second rotational stage 354. Together, all of these stages provide the three orthogonal translation axes and rotation about two orthogonal rotation axes. In the case where first and second subsystems are provided, all of these stages could form part of the first subsystem and the second subsystem could comprise a gantry configured to move all of the stages as unit along a further translation axis (which may be referred to as a major axis). The various translation stages need not necessarily have the specific arrangement described above and instead may be arranged in any other suitable manner to achieve the three mutually non-parallel (e.g. orthogonal) translation axes and two mutually non-parallel (e.g. orthogonal) rotation axes, and, where applicable, the further movement along the major axis.

Thus, the apparatus 330 is able to form a layered structure and deposit functional elements 108 such as electrically conductive elements during a single process. This is a significant improvement over prior art alternatives for manufacturing devices such as wiring harnesses, where wires need to be cut to length, stripped, terminated and then assembled together to form the harnesses. Such prior art wiring harnesses are largely manufactured by hand. Some complicated wiring harnesses can take days or even weeks to manufacture. The apparatus 330 provides significant improvements over such prior art techniques by allowing increased automation, thereby reducing manufacturing time, reducing quality variability and/or reducing and cost, as well as producing superior devices for all of the reasons described above. These advantages may be particularly beneficial in aircraft where downtime for fault finding and repairs is notoriously expensive.

The ability to automate the manufacture of the devices 102 with the apparatus 330 means that each device 102 may be identical. Once a design has been tested then it can be reliably made and used any number of times. If, for example, the device 102 is manufactured to aerospace standards, then as long as the correct materials are used then every item manufactured using that design will also conform to those standards.

Through the use of the apparatus 330, it may be possible to go from design to a manufactured device 102 in a matter of hours. Multiple prototypes can be made and tested, both for their electrical performance and their mechanical properties. In the example where the device 102 forms a wiring harness, this could alter the culture dramatically, making it possible for a designer to optimise a design through multiple iterations and be confident that the final product works. Not only would this save costly design time it would make it possible to create more sophisticated or even bespoke design that perform better. This is contrasted to the current practice for manufacturing prior art wiring harnesses where there is little culture of prototyping due to the turnaround times of weeks or even months.

As described above, the progressive deposition of material may comprise an additive manufacturing process. The additive manufacturing process may comprise fused filament fabrication (FFF). The progressive deposition of material may comprise extrusion of material through a nozzle. In some embodiments, the deposition module 332 may comprise a number of different end-effectors, each of which is capable of performing a specific function. For example, the deposition module 332 may comprise: an FFF deposition end-effector, an end-effector capable of depositing ink, an end-effector capable of extruding paste onto a surface, a series of end-effectors capable of embedding filaments of different sizes and type into the polymer, an end-effector capable of providing a coupling device, e.g. a termination, or a milling end-effector for subtractive machining. The end effectors described above may be interchangeable and the apparatus 330 may comprise a suitable arrangement for attaching the appropriate end-effector to the deposition module 332 at the appropriate time. Alternatively, the deposition module 332 may comprise any number of end-effectors integrated therewith and may be configured to switch between the appropriate end-effector at the appropriate time.

FIG. 15 shows an enlarged view of an example deposition module 332. The deposition module 332 may comprise a laser module 356 configured to irradiate a layer of precursor material 164 (e.g. an ink) deposited by the deposition module 332, and to transform the precursor material 164 into an elongate electrically conductive element 108 by increasing an electrical conductivity of the precursor material 164. The provision of a laser module 356 obviates the need for removing the structure and curing the precursor material in a different manner, such as in an oven. In such embodiments, the precursor material 164 may be deposited by any suitable arrangement, for example it may be printed onto the layer 104. In the embodiment depicted, the deposition module 332 is moved from right to left relative to the layers 104.

In some embodiments, the deposition module 332 may be configured to deposit an electrically conductive wire as shown in FIG. 5*b*. The deposition module 332 may comprise any suitable arrangement for depositing such an electrically conductive wire. For example, the deposition module 332 may be configured to lay an entire length of electrically conductive wire onto a layer 104 of the structure in a single action. Alternatively, the deposition module 332 may be configured to progressively deposit an electrically conductive wire during the formation of the structure.

Further, in some embodiments, the deposition module 332 may be configured to deposit an optical fibre, for example as depicted in FIG. 5*e*. The degrees of freedom provided by the five axes of movement allow the fibre to be provided efficiently and flexibly in a wide range of possible configuration within the layers 104 of the device 102 being manufactured. In some arrangements, the deposition module 332 is further configured to deposit a reinforcing fibre, for example of the type depicted in FIGS. 8 and 9. Through the use of the various stages which provide five different axis of movement, the apparatus 330 makes it possible to precisely lay a reinforcing fibre to provide reinforcing in precisely the right place and direction. The deposition module 332 may comprise any suitable arrangement for deposition of the optical fibres and/or reinforcing fibres.

FIGS. 16*a-d* illustrate an example method for manufacturing a device 102. The method uses components of the apparatus 330 but other apparatus could be used. The method comprises depositing a first layer 104 and a second layer 104. The second layer 104 is deposited on top of the first layer 404. The layers 404 are non-planar layers 104. Deposition of the layers is performed by moving the deposition module 332 with respect to the holder 338. This may be achieved in any of the ways described above.

In some embodiments, as shown in FIG. 16*a*, a first non-planar layer 104 is deposited onto a non-planar surface 459 of a pre-existing object 458 such that the non-planar layer 104 conforms to the surface of the pre-existing object 458. The pre-existing object 458 may, for example be: an aluminium frame, an injection or blow moulded part or a composite panel.

As shown in FIG. 16*b*, the method further comprises depositing a functional element 108 (e.g. elongate electrically conductive element) on the first non-planar layer 104 such that at least a portion of the functional element 108 has a geometry that conforms with the first non-planar layer 104. In some embodiments, as depicted, this may be achieved through deposition of a precursor by the deposition module 332 and subsequent irradiation of the precursor using a laser module 356. The deposition and irradiation is performed progressively as the deposition module 332 and holder 338 are moved with respect to one another. FIG. 16*c* shows the stage in the deposition once the entire functional element 108 has been deposited.

As shown in FIG. 16*d*, the method further comprises depositing a second non-planar layer 104 onto the first non-planar layer 104 with the functional element 108 arranged thereon, such that the functional element 108 is arranged at an interface 110 between the first and second non-planar layers 104. In the embodiment depicted, a further layer 104 is also deposited to form the device 102.

Whilst in the embodiment depicted, the second non-planar layer 104 is deposited after the entire functional element 108 has been deposited, this is not essential, and instead in some embodiments the second non-planar layer 104 may be deposited progressively while the functional element 108 is being deposited.

FIG. 17 shows a plan view of a device 102 with some layers removed to show an interface 110 on which are located four functional elements 108 consisting of elongate electrically conductive elements, and three SMDs 118*a*, 118*b*, 118*c*. In complete form, at least one further non-planar layer 104 will be arranged on top of the layer 104 seen in FIG. 17 such that the functional elements 508 and SMDs 118*a*, 118*b*, 118*c* are arranged at an interface 110 between two adjacent non-planar layers 104. The method may comprise connecting functional elements 108 such as those depicted to other functional elements 108 and/or SMDs 518*a*, 518*b*, 518*c* such as those depicted or other electrically functional elements to provide a desired overall electrical functionality. In embodiments where the functional elements 108 are elongate electrically conductive elements formed as printed conductive tracks, achieving the connections may be done by printing tracks between the electrically conductive elements. In embodiments wherein the functional elements are electrically conductive tracks comprises wires, electrical connection may be achieved through any suitable means, e.g. through soldering, welding or through the attachment and connection of terminations.

In any of the embodiments described above, the non-planar layers may comprise non-planar and planar portions which together form a layer which overall is non-planar. For example, the non-planar layer may comprise a curved and a flat portion as illustrated for example in FIG. 4.

The invention claimed is:

1. An apparatus for manufacturing a device, comprising:

a deposition module configured to progressively deposit filaments to form a structure comprising at least one layer, and to deposit one or more functional elements, each functional element comprising an electrically conductive element, an optical fiber or a hollow tube, so as to be embedded within the layer, or arranged between two layers; and a spatial manipulation system configured to allow relative movement between a structure being formed and at least a portion of the deposition module, the relative movement including translation relative to three mutually non-parallel translation axes and rotation about two mutually non-parallel rotation axes during either or both of the progressive deposition of material and the deposition of the one or more functional elements, wherein the spatial manipulation system comprises:

an x-y translation stage;

a z-height translation stage;

a first rotational stage; and a second rotational stage, wherein the deposition module is mounted on an arm which is connected to the x-y translation stage, and the x-y translation stage is configured to allow the arm, and thus the deposition module attached thereto, to be moved along an x-direction and a y-direction, thereby providing two orthogonal translation axes, wherein the holder is arranged on the first rotational stage which is operatively coupled to the z-height translation stage, and the z-height translation stage is configured to allow the holder to be moved vertically up and down along a z-direction, thereby providing a third orthogonal translation axis, and the first rotational stage is configured to allow the holder to rotate relative to the deposition module in a plane orthogonal to the z-direction, and wherein the second rotational stage is arranged between the deposition module and the arm, and the second rotational stage is configured to allow rotation of the deposition module in a plane parallel to the z-direction.

2. The apparatus of claim 1, wherein the spatial manipulation system comprises:

a first subsystem configured to provide the translation relative to the three mutually non-parallel translation axes and rotation about the two mutually non-parallel rotation axes; and a second subsystem configured to provide relative translational movement between the first subsystem and the structure being formed.

3. The apparatus of claim 1, wherein the progressive deposition of material comprises an additive manufacturing process.

4. The apparatus of claim 1, wherein the deposition module comprises a laser module configured to irradiate a layer of precursor material deposited by the deposition module to transform the precursor material and thereby form one or more of the electrically conductive elements by increasing an electrical conductivity of the precursor material.

5. The apparatus of claim 1, wherein the deposition module is configured to form one or more of the electrically conductive elements by depositing one or more respective preformed conductive elements.

6. The apparatus of claim 1, wherein the deposition module is further configured to deposit a reinforcing fiber.

7. The apparatus of claim 1, further comprising a temperature-controlled chamber which encloses at least the deposition module and holder, such that the ambient temperature around the structure can be controlled.

8. A method of manufacturing a device, comprising:

depositing a plurality of filaments to form at least one non-planar layer;

depositing one or more functional elements, each functional element comprising an electrically conductive element, an optical fiber or a hollow tube, the deposition being such that at least a portion of the functional element is: a) embedded in and geometrically conforms with one of the non-planar layers, or b) arranged between and geometrically conforms with two of the non-planar layers;

using a spatial manipulation system configured to allow relative movement between a device being formed and at least a portion of a deposition module for depositing the plurality of filaments and the one or more functional elements, the relative movement including translation relative to three mutually non-parallel translation axes and rotation about two mutually non-parallel rotation axes, during either or both of the deposition of the plurality of filaments and the deposition of the one or more functional elements, wherein the spatial manipulation system comprises:

an x-y translation stage;

a z-height translation stage;

a first rotational stage; and a second rotational stage, wherein the deposition module is mounted on an arm which is connected to the x-y translation stage, and the x-y translation stage is configured to allow the arm, and thus the deposition module attached thereto, to be moved along an x-direction and a y-direction, thereby providing two orthogonal translation axes, wherein a holder, which supports the device being formed, is arranged on the first rotational stage which is operatively coupled to the z-height translation stage, and the z-height translation stage is configured to allow the holder to be moved vertically up and down along a z-direction, thereby providing a third orthogonal translation axis, and the first rotational stage is configured to allow the holder to rotate in a plane orthogonal to the z-direction, and wherein the second rotational stage is arranged between the deposition module and the arm, and the second rotational stage is configured to allow rotation of the deposition module in a plane parallel to the z-direction.

9. The method of claim 8, wherein the plurality of filaments are deposited onto a non-planar surface of a pre-existing object.

10. The method of claim 8, further comprising using a spatial manipulation system configured to allow relative movement between a device being formed and at least a portion of a deposition module for depositing the plurality of filaments and the one or more functional elements, the relative movement including translation relative to three mutually non-parallel translation axes and rotation about two mutually non-parallel rotation axes, during either or both of the deposition of the plurality of filaments and the deposition of the one or more functional elements.

* * * * *